United States Patent
Sakata et al.

(10) Patent No.: US 6,945,652 B2
(45) Date of Patent: Sep. 20, 2005

(54) PROJECTION DISPLAY DEVICE

(75) Inventors: Hajime Sakata, Kanagawa (JP); Yukio Furukawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/180,114

(22) Filed: Jun. 27, 2002

(65) Prior Publication Data

US 2003/0011751 A1 Jan. 16, 2003

(30) Foreign Application Priority Data

Jul. 10, 2001 (JP) .......................................... 2001-209576

(51) Int. Cl.$^7$ ........................ G03B 21/26; G03B 21/00; G03B 21/28; H04N 3/02; G02B 26/08

(52) U.S. Cl. .......................... 353/30; 353/31; 353/34; 353/37; 353/99; 353/122; 348/201; 348/202; 348/203; 359/201

(58) Field of Search .......................... 353/30–31, 33–34, 353/37, 98–99, 122; 348/195–205; 359/201

(56) References Cited

U.S. PATENT DOCUMENTS

| | | | | |
|---|---|---|---|---|
| 4,979,030 A | * | 12/1990 | Murata | 348/196 |
| 5,089,908 A | * | 2/1992 | Jodoin et al. | 359/212 |
| 5,485,225 A | * | 1/1996 | Deter et al. | 348/804 |
| 5,920,361 A | * | 7/1999 | Gibeau et al. | 348/750 |
| 5,966,009 A | * | 10/1999 | Asada | 324/97 |
| 6,018,408 A | * | 1/2000 | Hong | 359/201 |
| 6,140,979 A | * | 10/2000 | Gerhard et al. | 345/7 |
| 6,170,953 B1 | * | 1/2001 | Lee et al. | 353/82 |
| 6,364,542 B1 | * | 4/2002 | Deane et al. | 385/92 |
| 6,426,781 B1 | * | 7/2002 | Lee | 348/754 |
| 6,545,260 B1 | * | 4/2003 | Katashiro et al. | 250/227.26 |
| 6,577,429 B1 | * | 6/2003 | Kurtz et al. | 359/279 |
| 6,594,090 B2 | * | 7/2003 | Kruschwitz et al. | 359/707 |
| 6,606,180 B2 | * | 8/2003 | Harada | 359/204 |
| 2002/0196377 A1 | | 12/2002 | Furukawa et al. | 348/742 |

FOREIGN PATENT DOCUMENTS

JP 11-305710 11/1999

OTHER PUBLICATIONS

Electronics and Communications in Japan, vol. 68, No. 4, pp. 387–394 (English translations only, pp. 1–22).
Electronics and Communications in Japan, vol. 68, No. 4, pp. 387–394 (only in Japanes language).

* cited by examiner

*Primary Examiner*—David Gray
*Assistant Examiner*—Magda Cruz
(74) *Attorney, Agent, or Firm*—Fitzpatrick, Cella, Harper & Scinto

(57) ABSTRACT

Light beams having different wavelengths emitted from red and blue semiconductor lasers and a laser diode pumped green solid-state laser are incident on respectively different surfaces of a color combining element and are overlaid on a single light path. Multiple beam interference films of the color combining element allow only the light beams having the oscillating wavelengths corresponding to the respective light sources to pass therethrough or reflect thereon so as to combine the light beams. A collimator collimates the light beams so that the beam waist of the light beams lies around a projection plane. When two-dimensional scanning is performed by radiating the light beams onto a micromechanical mirror and then onto a galvanometer mirror for scanning light in the horizontal and vertical directions, respectively, a color image is displayed on the projection plane by arranging pixels in array, each pixel consisting of overlapping pulses of light of three colors.

32 Claims, 10 Drawing Sheets

PROJECTION DISPLAY DEVICE

BACKGROUND OF THE INVENTION

1. Field of the Invention

The present invention relates to projection display devices, and more particularly, to a projection display device which projects a still image or a moving image, which is formed on a screen such as a computer screen or a TV screen, onto a projection plane such as a screen or a wall by scanning light beams.

2. Description of the Related Art

Hitherto, so-called projection laser displays which scan and project laser beams of three colors, that is, red, green, and blue, have been widely available, and an exemplary projection laser display is described in Electronics and Communications in Japan, Vol. 68, No. 4, pp. 387–394. In this example, red, green, and blue laser beams are amplitude modulated by an optical modulator and are combined on a single optical axis, and then an image is projected onto a screen by scanning the combined beams two-dimensionally with horizontal and vertical optical scanning elements. Although known optical scanning elements generally include an acousto-optic deflector, an electro-optic deflector, and a mechanical deflector, the acousto-optic and the electro-optic deflectors are impractical due to problems of a small deviation angle and a color dispersion; accordingly, the mechanical deflector is generally used. Exemplary mechanical deflectors include a polygonal mirror and a galvanometer mirror. Tone and hue of the image are adjusted by modulating the intensity of light emitted from the laser beam sources.

FIG. 10 illustrates the configuration of a video projector disclosed in U.S. Pat. No. 5,485,225 in which laser beams having different wavelengths are overlaid on a single light path by dichroic mirrors 118 and 119 and then the overlaid beams are projected by a beam scanner 130. FIG. 10 also illustrates 1) a first component group 101 having light sources 104–106, light modulators 107–109, light bundles 114–116 and an optical arrangement 117 with mirrors 118–121, 2) a second component group 102 with a deflecting device 130 having a polygonal mirror 131 and a swiveling mirror 132, an optical system 134 and a screen 136, and 3) a third component group 103 including common light bundle 122, first optical system 124, optical fiber 126 and second optical system 128. The luminous intensity of the radiated laser beam is controlled by modulating the beam with an external light modulator or by directly modulating the beam from a light emitting diode.

FIG. 11 illustrates the configuration of an image projector disclosed in Japanese Patent Laid-Open No. 11-305710 in which, instead of scanning light beams, the emission time of laser pulses for the red, green, and blue colors are shifted from each other in order to commonly use a single light valve 206 for the pulses of light of the three colors. Although the projection time of the laser pulses on a projection plate 208 shifts from color to color, the human eye observes the projected image as a color image because of the visual integration effect of the human eye. The image projector is also shown to include laser light sources 201–203, dichroic prism 204, integrator 205 and projections 207. Since pulsed lasers are used as the red, green, and blue light sources, light modulation is performed by modulating the intensity of light with the light valve, which is disposed after the light sources.

However, known projection display devices using lasers, including the above projectors, have the following problems.

When light intensity modulation is performed while scanning the laser beams, the laser beams are spatially coupled with each other, leading to poor separation between adjacent projected pixels, thereby causing color drift, uneven brightness, uneven tone, and so forth; those problems are especially acute in the case of high-resolution images.

Also, a color combining component is needed for combining a plurality of laser beams on a single light path, wherein the laser beams for color display have different oscillating wavelengths from each other, thereby resulting in a projection display device with a large size, a complicated parts-mounting process, and high cost.

Furthermore, when pulsed lasers are used, since it is difficult to restrain intensity variations from one pulsing shot to another by feedback control, there is a risk of uneven image display problems.

Moreover, oscillating red, green, and blue light pulses in a time sequential manner causes the pixel clock for these three colors to extend, resulting in a smaller number of displayable image resolution points. To avoid this problem, modulation of each color must be performed in one third of the pixel clock width.

SUMMARY OF THE INVENTION

It is an object of the present invention to provide a small, less expensive projection display which forms a high-resolution projection image free from image unevenness by scanning light beams.

That is to say, it is an object of the present invention to provide a projection display device which emits light beams as pulsed light by scanning the light beams toward a projection plane and also by splitting the light beams between adjacent pixels when scanning.

The projection display device according to the present invention achieves a high-resolution image free from image unevenness by projecting the light beams. Also, since the scanned light beams can be dealt as a string of pulsed light corresponding to a pixel clock, safety standards of laser products standardized, for example, in Japanese Industrial Standard JIS C 6802 and International Electrotechnical Commission IEC 60825 can be precisely applied to the device. When the light beams can not be defined as pulsed light kept in a certain period of duration, it is difficult to precisely grade a laser safety level depending on conditions, since a time in which the light beams intersect an aperture of a measuring probe for scanning is not fixed when measuring laser radiation.

In the projection display device, the light beams are plural light beams having central wavelengths of red, green and blue colors. With this configuration, a color image is displayed.

In the projection display device, the pulses of light achieve tone and hue of the display image by performing pulse width modulation in a pixel clock width. Alternatively, the pulses of light achieve tone and hue of the display image by performing a pulse number modulation in a pixel clock width, by performing light intensity modulation, or by being controlled independently of each other with respect to the plurality of light beams. With any of these configurations, a color image having precise hue and tone is displayed.

In the projection display device, the light scanning elements scan the light beams in a horizontal scanning direction and a vertical scanning direction and display an image on the projection plane. More particularly, at least one of the scanning elements is a galvanometer mirror fabricated by a semiconductor process or mechanically. Alternatively, at least one of the light scanning elements is a rotating polygonal mirror. With any of these configurations, the projection display device has a small size and projects a high-resolution image.

In the projection display device, the plural light beams are combined on a single light path by a color combining element such as an optical wavelength filter, a color separation prism, or a diffraction grating. Also, the plural light beans include pulses of red, green, and blue light which are emitted synchronously. With this configuration, the projection display device displays an image having precise color reproduction and high-resolution.

In the projection display device, the plural light beams are incident on at least one of the light scanning elements at different angles and then are scanned. Alternatively, the plural light beams are incident at different points on at least one of the light scanning elements and are scanned. With any of these configurations, the projection display device has a reduced number of parts, a small size, and a low price. Also, since the pulses of light corresponding to a display pixel are projected in a time-shifting manner from color to color, the light beams can be reliably dealt as a string of pulsed light and the wavelengths can be considered separately, thereby allowing the laser safety standards to be applied to the projection display device further precisely.

In the projection display device, at least one of the light sources for emitting the light beams is an edge emitting laser. Alternatively, at least one of the light sources for emitting the light beams is a super-luminescent diode, a surface emitting laser, a light emitting diode, a resonant-type light emitting diode, or a laser diode pumped solid-state laser. In another alternative, at least one of the light sources for emitting the light beams emits the second harmonic of laser light as a light beam. With any of these configurations, the projection display device has a small size by making the light source smaller. In addition, the light source operates with low electrical power and generates less heat because of high electricity-light conversion efficiency of the light source, resulting on either no structure or a simple structure being needed for heat radiation.

Furthermore, the display image may be monochromatic or chromatic. The size of a display screen may be determined depending on the application of the projection display device. For example, a screen of 10 to 17 inches may be used for a computer display, a personal TV, and a display for a meeting or presentation with a small group. A large screen of 50 inches or larger may be used for a meeting or presentation with a large group. For a personal projection display device, for example, when it is mounted on a pair of eye-glasses, a small screen of 1 inch or smaller may be used. As described above, a magnification of a projection optical system and light outputs of the light sources can be determined in accordance with the size and the brightness of the screen. The projection plane is not limited to a specially made screen, and the image may be displayed by projecting it onto a wall, a sheet of paper, a simple screen, a sheet of frosted glass, and so forth.

Further objects, features and advantages of the present invention will become apparent from the following description of the preferred embodiments with reference to the attached drawings.

DESCRIPTION OF THE PREFERRED EMBODIMENTS

Referring now to the attached drawings, embodiments according to the present invention will be described.

First Embodiment

Figure 1:
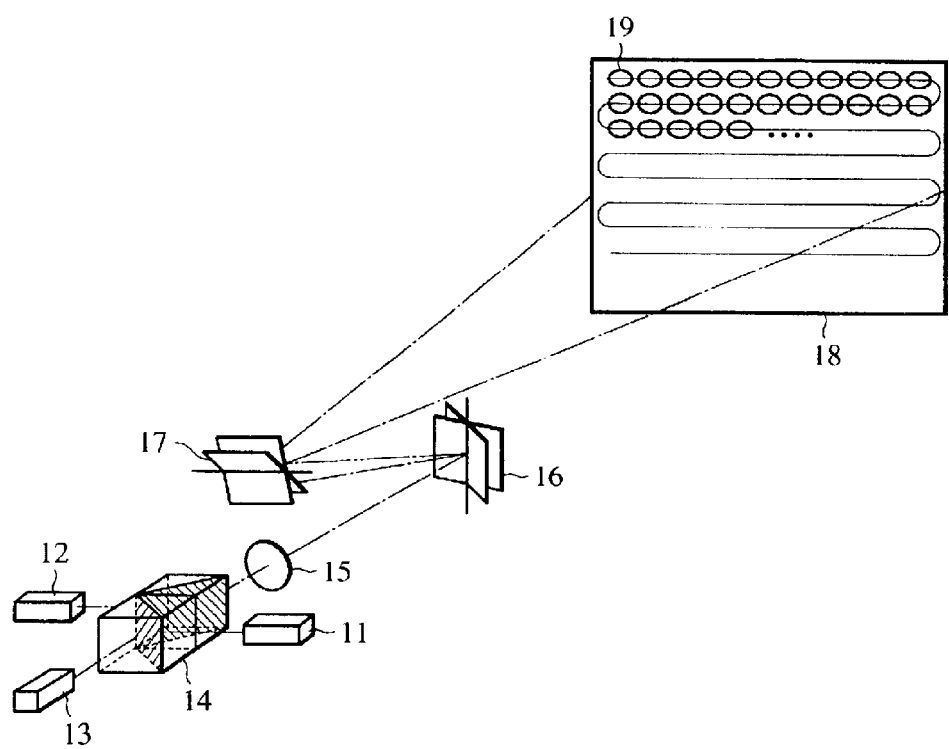
FIG. 1 is an illustration of a projection display device according to a first embodiment of the present invention.

FIG. 1 illustrates the configuration of a projection display device according to a first embodiment of the present invention, wherein reference numerals 11, 12, and 13 denote a light source formed of a red semiconductor laser, a light source formed of a blue semiconductor laser, and a light source formed of an infrared laser diode pumped green solid-state laser (hereinafter, laser diode is referred to as LD), respectively, reference numerals 14, 15, and 16 denote a color combining element having multiple beam interference films formed therein, a collimator lens, and a micromechanical mirror comprising a silicon substrate, respectively, and reference numerals 17, 18, and 19 denote a mechanical galvanometer mirror driven by a stepping motor, a projection plane, and pixels displayed by laser projection, respectively.

The semiconductor laser 11 is a red light source formed from the compound of InGaAlP having a central wavelength of 635 nm and the semiconductor laser 12 is a blue light source formed from the compound of InGaN having a central wavelength of 445 nm. Both light beams emitted from the semiconductor lasers 11 and 12 are transformed into pulses by directly controlling the drive currents thereof. The LD pumped solid-state laser 13 produces an infrared light beam having a wavelength of 1.06 $\mu$m by allowing a light beam having a wavelength of 808 nm emitted from a pumping infrared diode laser to pass through an Nd:YVO$_4$ crystal and produces a green light beam having a wavelength of 532 nm by using a KTP crystal having a periodic domain inversion structure, wherein the green light beam is the second harmonic of the infrared light beam. Modulation is performed by directly modulating the pumping diode laser.

Light beams having different wavelengths emitted from a plurality of the light sources are incident on respectively different surfaces of the color combining element 14 and are overlaid on a single light path. The multiple beam interference films, which are shaded portions in the color combining element 14 illustrated as in FIG. 1, allow only the light beams having the oscillating wavelengths corresponding to the respective light sources to pass therethrough or reflect thereon. Therefore, the light beams are efficiently combined. The collimator 15 collimates the light beams so that the beam waist of the light beams lies around the projection plane. By radiating the light beams onto the micromechanical mirror 16 for scanning light in the horizontal direction, and then by radiating them onto the galvanometer mirror 17 for scanning light in the vertical direction, two-dimensional, i.e., horizontal and vertical, scanning is performed by the two mirrors.

Figure 2:
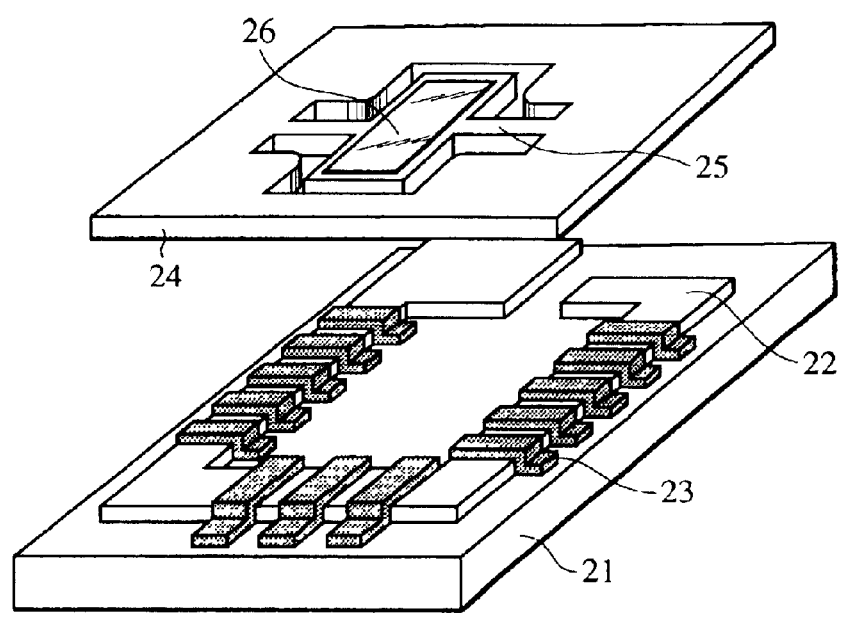
FIG. 2 illustrates the configuration of a micromechanical optical scanning element used in the projection display device according to the first embodiment.

The micromechanical mirror 16 for scanning light is a mirror formed from a silicon substrate by utilizing micromechanical technology, and FIG. 2 illustrates the configuration of the mirror 16. The mirror 16 has a lower silicon substrate 21 having a core 22 formed from a magnetic material, a plurality of copper coils 23 formed by patterning so as to wind around the core 22, and an upper silicon substrate 24 having a mirror surface 26 supported by torsion bars 25 formed by etching. The mirror 16 is designed so that an electromagnetic force maintains a rotating resonance state by bonding the upper and lower silicon substrates together. The mirror 16 has a structure in which an electrostatic force or a piezoelectric force is generated as a driving force. In a SVGA image having 800 horizontal lines and 600 vertical lines, when the light beams are scanned by the micromechanical mirror in a reciprocating manner as schematically shown in FIG. 1, the horizontal and vertical scanning frequencies thereof are 18 kHz and 60 Hz, respectively. In such a case, in practice, the horizontal frequency is sometimes set to be about 23 kHz in consideration of vertical blanking in the display system. In an XGA image having higher resolution, the horizontal scanning frequency thereof becomes higher accordingly. When a plurality of light beams are scanned two dimensionally in such a display, a color image is displayed on the projection plane by arranging the pixels 19 in array, each pixel consisting of overlapping pulses of light of three colors. The light intensity for each color is controlled by controlling a pulse width or the number of pulses in a period for forming one pixel.

Figure 3:
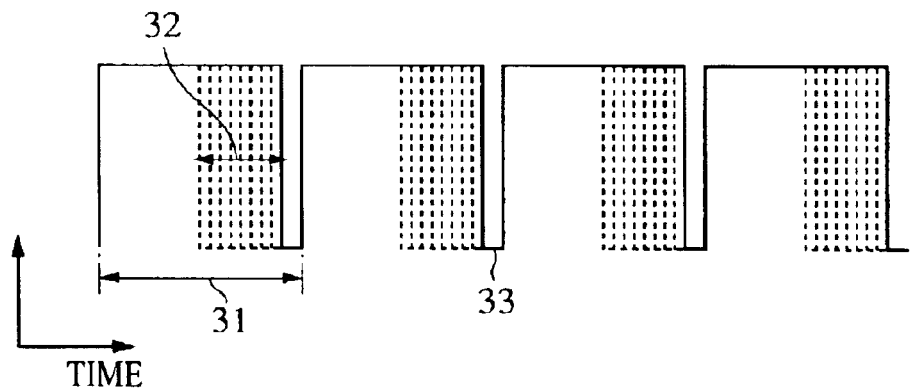
FIG. 3 illustrates pulse width modulation of light beams used in the projection display device according to the first embodiment.

FIG. 3 illustrates pulse width modulation by way of example, wherein a width 32 of pulses contained in a clock width 31 in a pixel is modulated. Accordingly, starting and stopping times for emitting pulses of light of three colors are not in perfect agreement with each other; however, a stopping period 33 of the pulse of light corresponding to the spacing between adjacent pixels is reliably provided in the clock width in a pixel. In other words, color light beams of a combination of overlapping red, green, and blue light beams can be treated as a string of pulses consisting of pulses of light having a pulse width smaller than or equal to the clock width of a pixel. When an image is formed with 800 horizontal scanning lines, 600 vertical scanning lines, and a vertical scanning frequency of 60 Hz, the clock width of a pixel is about 35 nano-seconds. The maximum pulse width of a pulse of light is limited to within the above clock width. When each laser of the projection display device emitting red, green, and blue light beams is designed to have an output of about 30 to 60 mW, a projection plane having a diagonal line of, for example, about 14 inches has a brightness of about 100 cd/m$^2$, thereby displaying a sufficiently visible image in an environment such as in a bright room.

In the first embodiment, by using a semiconductor laser having a wavelength of 1060 nm as a pumping laser, the light of the second harmonic, which has a wavelength of 530 nm, may be used as the green light source. Alternatively, up-conversion light produced by allowing an infrared semiconductor laser to pump a piece of glass doped with a rare earth element such as Er or Yb may be used. In this case, the light has an oscillating wavelength ranging from 520 to 550 nm. Alternatively, down-conversion light produced by allowing an ultraviolet semiconductor laser to pump a piece of glass or an optical fiber doped with a rare earth element such as Tb or pigment may be used. In this case, the light has an oscillating wavelength ranging from 530 to 550 nm depending on the material used. Alternatively, the green light may be produced directly by a semiconductor laser including a compound such as InGaN/GaN, ZeSe/ZnMgSSe, ZnCdSe/BeZnTe, or MgSe/BeznTe.

By using an infrared semiconductor laser having a wavelength of about 850 to 950 nm or an Nd:YAG laser having a wavelength of 946 nm for producing pumping light, the light of the second harmonic produced by an MgO-doped LiNbO$_3$ crystal having a distribution domain inversion structure may be used as the blue light source. Alternatively, up-conversion light produced by allowing an infrared or red semiconductor laser to pump a piece of glass doped with a rare earth element such as Er or Tm may be used. In this case, the light has an oscillating wavelength ranging from 450 to 480 nm. Alternatively, down-conversion light produced by allowing an ultraviolet semiconductor laser to pump a piece of glass or an optical fiber doped with a rare earth element such as Eu or pigment may be used. In this case, the light has an oscillating wavelength ranging from 610 to 630 nm depending on the material used.

Suitable semiconductor lasers include not only so-called edge light emitting lasers in which a laser oscillator is formed in a direction parallel to the surface of the semiconductor substrate thereof and a laser beam is radiated from the edge of the substrate, but also so-called surface emitting lasers in which a laser oscillator is formed in a direction perpendicular to the substrate and a laser beam is radiated in the same direction. A surface emitting laser easily produces a light beam having a small radiation angle and high directivity since the light emission aperture thereof is larger than that of an edge emitting laser and the light emission is performed non-directionally.

Figure 4:
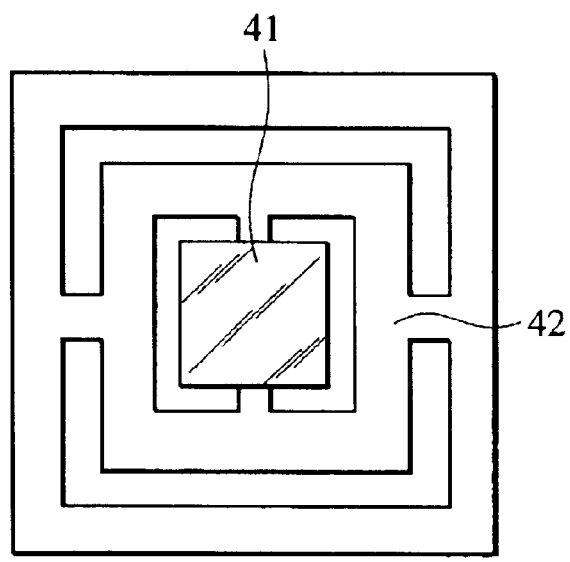
FIG. 4 illustrates another micromechanical optical scanning element used in the projection display device according to the first embodiment.

Horizontal scanning and vertical scanning may be performed by the mirrors that have structures independent of each other, as shown in FIG. 1, or by a scanning element having a so-called gimbal structure in which a horizontal scanning vibration surface 41 and a vertical scanning vibration surface 42 are nested, as shown in FIG. 4. Scanning with the mirrors having independent structures has an advantage in that different resonant frequencies for the horizontal direction and the vertical direction can be easily designed, and scanning with the device having the gimbal structure has an advantage in that the scanning accuracy thereof is improved since scanning the light beam two-dimensionally can be performed at the same time.

Modifications of the foregoing scanning configuration are of course possible. The high speed scanning element, i.e., the horizontal light scanning element, may be a mechanical galvanometer mirror driven by, for example, a motor or a polygonal mirror, and the low speed scanning element, i.e., the vertical light scanning element, may be a silicon micromechanical mirror, or both scanning elements may be silicon micromechanical mirrors. A suitable configuration is selected in consideration of the cost requirements, the size, and the power consumption of the projection display device, the size and the number of resolution points of the image, and so forth.

The color combining element may be selected from a variety of optical components including a grating, a prism, a directional coupler, and an optical fiber. The optical system used for performing two-dimensional scanning and for projection is not limited to a simple collimator lens; it may be more effective to use lenses such as an f–θ lens and an arctangent lens, which correct for distortion of the image.

Second Embodiment

Figure 5:
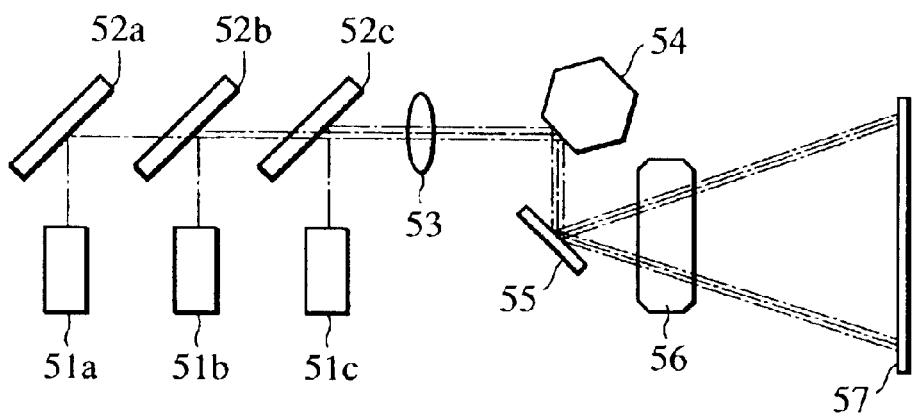
FIG. 5 is an illustration of another projection display device according to a second embodiment of the present invention.

Another projection display device according to a second embodiment of the present invention will be described with reference to FIG. 5. Unlike the first embodiment, the projection display device according to the second embodiment uses, as light sources, super-luminescent diodes having a lower coherency than that of a laser. Each laser feedback of a red light source 51a and a blue light source 51b is suppressed by skewing the end face of the resonator of the corresponding semiconductor laser relative to an axis of a waveguide of the laser or by applying an anti-reflection film on the end face. This configuration allows the oscillating light to have a larger spectral line width and a lower spatial coherency. Although the directivity of the light beam becomes lower than that of the laser, this directivity does not cause a problem when performing display by projection according to the present invention. The projection display device has an advantage in that the risk of glare caused by laser speckles can be minimized since the projection display device has low coherency, wherein the glare may occur depending on the condition of the projection plane. The second harmonic generation in which a super-luminescent diode is used as an exciting light source allows a green light source 51c to have low coherency. Alternatively, an element having a low reflectance at the edge of a resonator of a green semiconductor laser may be used.

In the second embodiment, red, green, and blue emitted light beams are combined on a single light path by a color combination element such as an optical wavelength filter, a color separation prism, or a diffraction grating. In the exemplary projection display device shown in FIG. 5, the red, green, and blue emitted light beams are reflected at corresponding dielectric multilayer films 52a, 52b, and 52c, respectively, sequentially travel together on a single light path, and are guided to light scanning elements 54 and 55 through a collimator lens 53. Although the red, green, and blue light beams are illustrated separately in the drawing for better understanding, in practice, the pulses of light of the three colors are identical spatially and temporally. The light scanning element 54 is a rotating polygonal mirror and the light scanning element 55 is a galvanometer mirror driven by a motor. The light beams which are swept two-dimensionally by the two light scanning elements are projected on a projection plane 57 through a projection optical system 56 by which sufficient image uniformity is achieved in accordance with deviation angles of the mirror surfaces.

Modulation of the emitted light beams may be performed by directly modulating the electrical current input to the super-luminescent diode, or by modulating the light intensity with an external light modulator in the case of the LD pumped solid-state laser. A suitable external light modulator is of an acousto-optic type or an electro-optic type from the viewpoint of high speed and high light utilization efficiency. Other than these modulators, a light modulator based on micromechanics or a light modulator using a liquid crystal may be used in consideration of the number of image resolution points and/or brightness of the projection plane.

With the foregoing configuration, the image projected on a projection plane achieves an extremely high definition display free from speckle noise.

Third Embodiment

Another projection display device according to a third embodiment of the present invention will be described with reference to FIG. 6. In the third embodiment, light beams from a red light source 61, a green light source 62, and a blue light source 63 are incident on light scanning elements 65 and 66 without combining these beams with a color combining element. More particularly, as shown in the drawing, the three light beams are incident on the horizontal scanning element 65 at different angles, are reflected at the vertical scanning element 66, and then form an image on a projection plane 67. A collimator 64 can be disposed either in front of or behind the light scanning elements 65 and 66 in the drawing. The optimal arrangement of the collimator optical system 64 is set considering the distance to the projection plane, the image resolution, the size of the projection display device, and so forth. The light scanning element 65 is a micromechanical mirror comprising a silicon substrate by utilizing micromechanical technology and is designed so as to maintain a resonant oscillating state by an electrostatic force. The vertical scanning element 66 may be a galvanometer mirror having an independent structure, as shown in FIG. 6, or a scanning element having a so-called gimbal structure in which a horizontal scanning vibration surface and a vertical scanning vibration surface are nested, as shown in FIG. 4.

Figure 6:
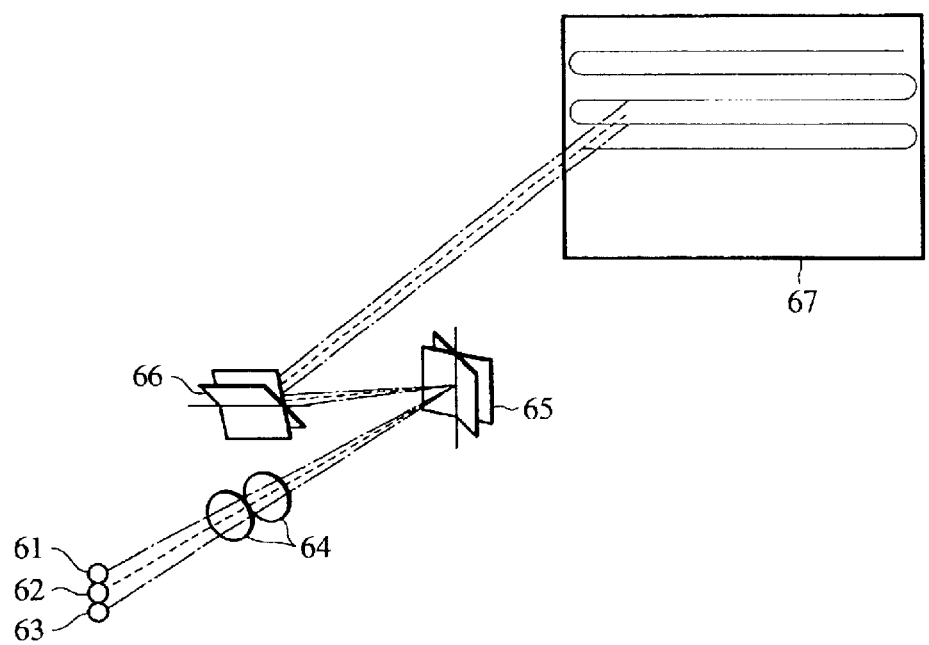
FIG. 6 is an illustration of another projection display device according to a third embodiment of the present invention.

In the exemplary projection display device shown in FIG. 6, light spots for the three colors are projected onto the projection plane in array in the vertical direction. Although these light spots are projected on a single image-forming spot in a time-shifting manner, a color image is viewed properly without problems due to the visual integration effect since the image is drawn in an extremely short period of time. Tone is achieved by performing pulse width modulation of the pulses of light. A color scheme is achieved by arranging the color intensities of the red, green, and blue color components. In the third embodiment, the vertical light scanning element 66 is required to scan a part of the light beams beyond the upper and lower edges of the display screen so that the three color beams are projected within the display screen. In the exemplary projection display device shown in FIG. 6, part of the red light beams and part of the blue light beams extend beyond the upper and lower edges of the display screen, respectively.

Figure 7:
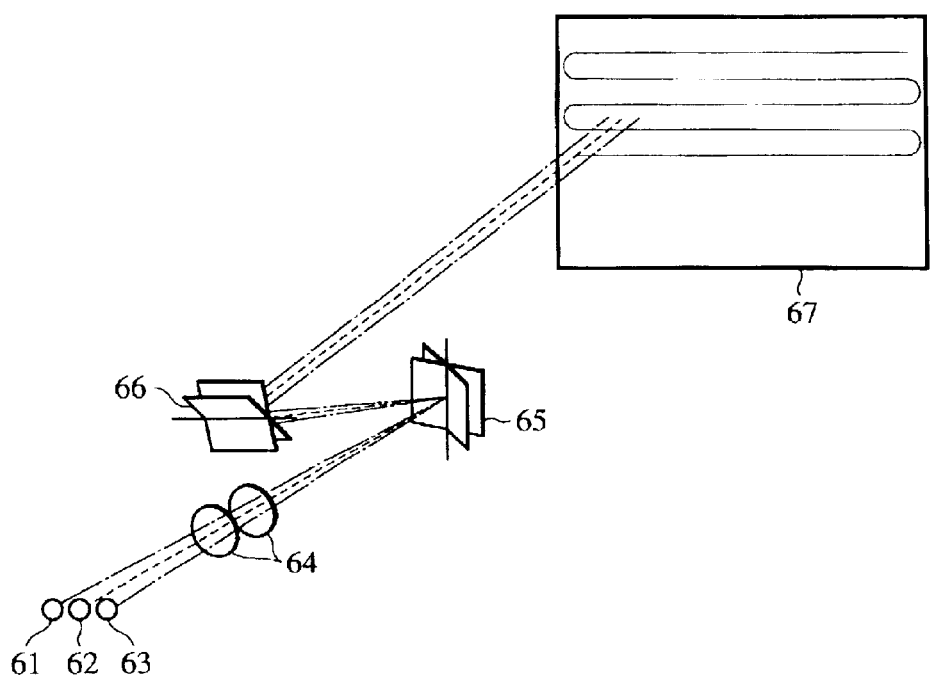
FIG. 7 is another illustration of the projection display device according to the third embodiment of the present invention.

Likewise, a color display is achieved even when the light spots for the red, green, and blue colors are arranged in array horizontally on the projection plane, as shown in FIG. 7. In this case, the horizontal scanning element 65 performs scanning beyond the right and left edges of the display screen so as to scan a part of the light beams beyond the right and left edges. In the exemplary projection display device shown in FIG. 7, part of the red light beams and part of the blue light beams extend beyond the right and left edges of the display screen, respectively. However, laser light extending beyond the upper or lower edge or the right or left edge of the display screen, as described above, does not take place in practice since such an emission is stopped electrically.

In the third embodiment, red, green, and blue light beams are not projected on a single pixel position at the same time. Therefore, as long as laser light for each color is converted into a pulse in accordance with the corresponding pixel, only a string of pulses in a limited pulse duration time is always incident on an aperture of a measuring probe, even when the emitted light power or the emitted light energy is measured by disposing the aperture at the point which a light scanning beam intersects. That is, the projection display device according to the third embodiment has an advantage in that appropriate measures in view of laser safety can be taken when a laser safety level is graded according to laser safety standards, since the pulse width and the emitted light power are distinctly set in respectively prescribed ranges.

Fourth Embodiment

Figure 8:
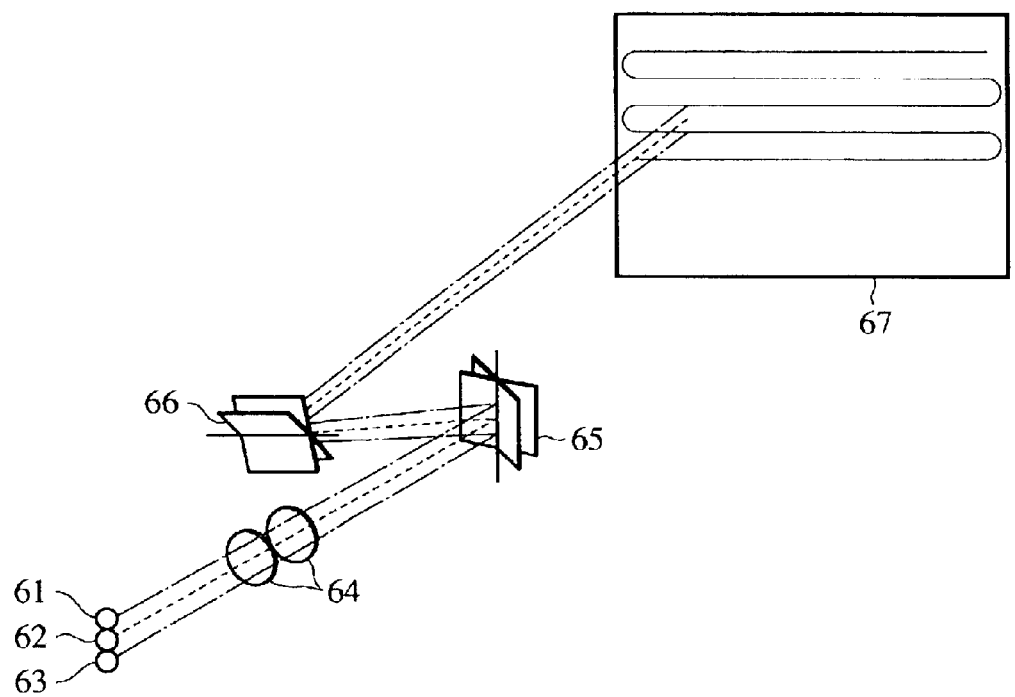
FIG. 8 is an illustration of another projection display devices according to a fourth embodiment of the present invention.

Another projection display device according to a fourth embodiment of the present invention will be described with reference to FIG. 8. As in the third embodiment, in the fourth embodiment, light beams from the red, green, and blue light sources 61, 62, and 63 are guided in parallel to each other, and are incident on different positions of the mirror surface of the light scanning element 65 without using a color combining element. As a result, light spots for the three colors are separately formed on the projection plane 67 in the horizontal or vertical direction. Although these light spots are projected on a single image-forming spot in a time-shifting manner, the color image can be viewed properly without problems, due to the visual integration effect, since pixel information is drawn in an extremely short period of time. Tone and hue of the pixel are achieved by modulating the intensity of the light beams while keeping the width of the pulses fixed. As in the third embodiment, the scanning range of the light scanning elements extends horizontally and vertically to a sufficient degree so that the three color beams are drawn within the display screen.

Fifth Embodiment

Since any of the exemplary projection display devices according to the foregoing embodiments uses a high directive light source as a semiconductor laser or a super-luminescent diode, the emitted light can be dealt with as a light beam traveling in a straight line. However, an incoherent light source such as a light-emitting diode or a resonant-type light-emitting diode cannot be dealt with as a straight-traveling light beam, since the incoherent light source has a wide radiation angle at the light-emitting surface thereof.

Figure 9:
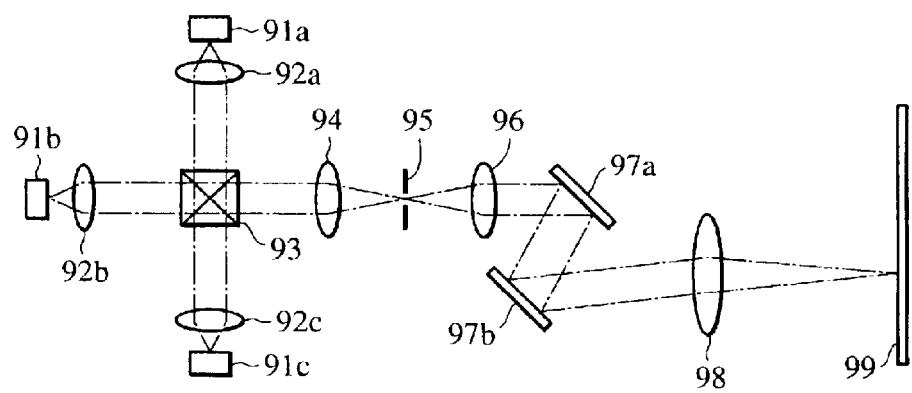
FIG. 9 is an illustration of another projection display device according to a fifth embodiment of the present invention.
Figure 10:
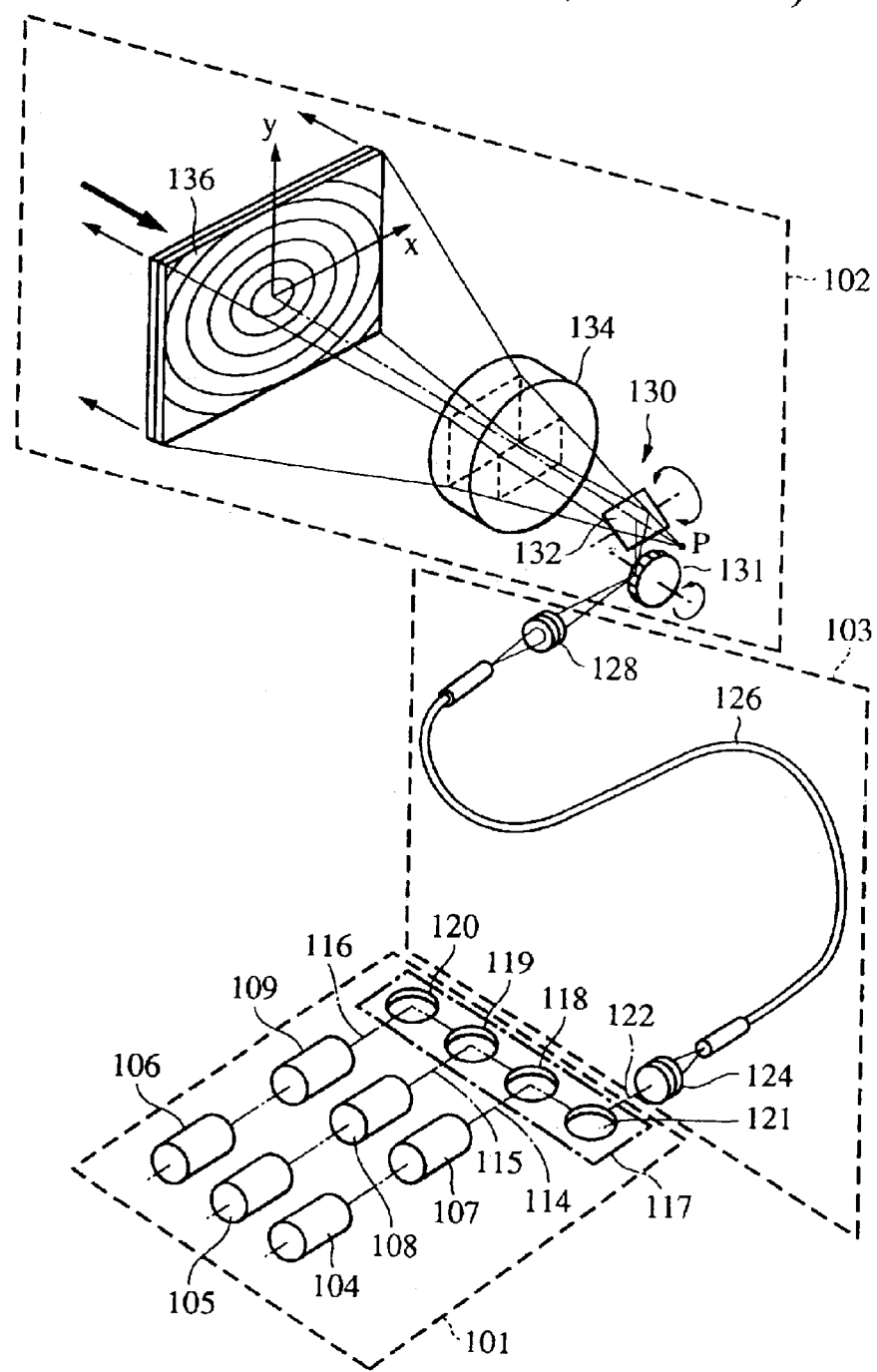
FIG. 10 is a schematic view for illustrating a conventional video display device.
Figure 11:
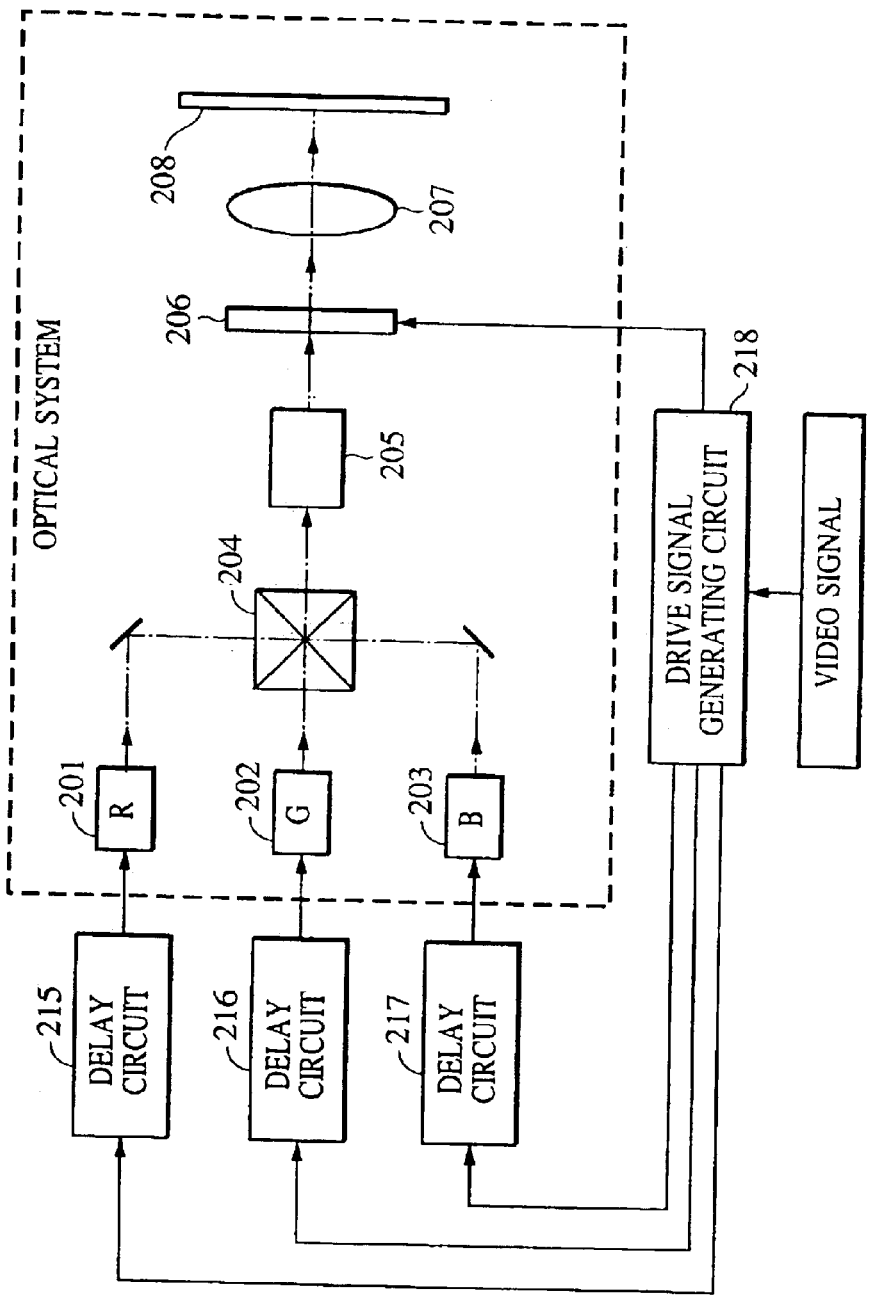
FIG. 11 is a block diagram for illustrating another conventional image display device.

FIG. 9 illustrates another projection display device using an incoherent light source according to a fifth embodiment of the present invention. Collimator lenses 92a, 92b, and 92c are disposed in front of the radiation surfaces of a red light-emitting diode 91a, a green light-emitting diode 91b, and a blue light-emitting diode 91c, respectively, so as to convent light emitted from these light-emitting diodes into parallel light beams. The light combined at a color combining element 93 is condensed at a condenser lens 94. Then, the higher order components of the light are filtered by a spatial filter 95 and the filtered light is converted into a parallel light beam by a collimator lens 96. Subsequently, the parallel light beam is scanned horizontally and vertically at a light scanning element 97a and 97b, respectively, and forms an image at a projection plane 99 via a projections lens 98.

The projection display device according to the fifth embodiment uses a light-emitting diode as a light source. This device is applicable to a projection display device for use close to an eye such as a head mount display or an eyeglass type display or to a small portable projection display device such as a cellular phone or an electronic notepad. That is, the light-emitting diode is applicable to a small display, since it is small and consumes little electric power. A projection optical system is considered as an optical system for converting an original image emitted at a light-emitting surface, which corresponds to a position of the spatial filter 95 in the fifth embodiment, so as to form an image at a projection plane. That is, the light utilization efficiency is improved by allowing the optical system having a large numerical aperture to transmit the light emitted from the light source and to form an image on a projection plane.

The maximum light output of the red, green, and blue light-emitting diodes used in the projection display device according to the fifth embodiment is selective depending on the applications thereof. For example, in a retina projection-type, the maximum light output is about 10 $\mu$W and about one-tenth of the amount of the output light is transmitted to a retina functioning as a projection plane. Under such a brightness level, sufficient quality of display is achieved because of the smallness of the display size. Also, in a projection-type for use close to an eye, the maximum light output is smaller than or equal to 1 mW and display is performed with about one-tenth of the light output. Further, in a portable-type projection display device, the maximum light output is determined in the range from several 100 $\mu$W to several 10 mW. The light output of the projection display device decreases to about one-tenth to one-third of the maximum light output of its light source because of losses at a lens optical system and light scanning elements disposed in the projection display device. Tone of an image is achieved by setting a radiation pulse width of each of the light-emitting diodes smaller than or equal to a pixel clock width, specifically in the case of an SVGA image, by setting the radiation pulse width up to the maximum of 20 to 30 ns, and also by controlling the pulse width or the pulse peak value within the preset range. Hue of the image is achieved by controlling the light sources for the three colors.

The projection display device according to the fifth embodiment has a small projection plane. When a large projection plane is required, light-emitting diodes or a light-emitting diode array, both having large light outputs, may be used. Alternatively, resonant-type light-emitting diodes having a large output may be used. The resonant-type light-emitting diode is designed to improve light emission efficiency by forming multiple beam interference films made from a compound semiconductor or a dielectric, or by forming metal reflection films, on the upper and lower surfaces of a light-emitting layer thereof, or by forming the multiple beam interference film or the metal reflection film on the lower surface. In addition, the resonant-type light-emitting diode is suitable for performing relatively distant display by projection because of excellent directivity of a radiation pattern with a resonator provided therein.

As described above, the present invention provides a less expensive and small projection display device which displays a highly precise and accurate image on an unselective projection plane, which has little color drift, uneven brightness, and uneven tone, and which achieves high light utilization efficiency by using a semiconductor laser, an LD pumped solid-state laser, a super-luminescent diode, a light-emitting diode, or the like as a light source. In addition, regardless of a display image and a measuring condition, a laser safety level is determined reliably according to laser safety standards and appropriate measures are also taken reliably, since the emitted light is treated as a string of pulses of light having a limited pulse width.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A projection display device for displaying an image by projecting light beams onto a projection plane, comprising:
    light sources for emitting the light beams; and
    light scanning elements for scanning the emitted light beams toward the projection plane,
    wherein the light beams are radiated as pulses of light corresponding to respective pixels by splitting the light beams between adjacent pixels when the light beams are being scanned.

2. The projection display device according to claim 1, wherein the light beams are plural light beams having central wavelengths of red, green, and blue colors.

3. The projection display device according to claim 2, wherein the plural light beams are combined on a single light path by a color combining element.

4. The projection display device according to claim 3, wherein the plural light beams comprise pulses of red, green, and blue light which are emitted synchronously.

5. The projection display device according to claim 2, wherein the plural light beams are incident on at least one of said light scanning elements at different angles and then are scanned.

6. The projection display device according to claim 2, wherein the plural light beams are incident at different points on at least one of said light scanning elements and are scanned.

7. The projection display device according to claim 1, wherein the pulses of light achieve tone and hue of the display image by performing pulse width modulation in a pixel clock width.

8. The projection display device according to claim 1, wherein the pulses of light achieve tone and hue of the display image by performing a pulse number modulation in a pixel clock width.

9. The projection display device according to claim 1, wherein the pulses of light achieve tone and hue of the display image by performing light intensity modulation.

10. The projection display device according to claim 1, wherein the pulses of light achieve tone and hue of the display image by being controlled independtly of each other with respect to the plurality of light beams.

11. The projection display device according to claim 1, wherein said light scanning elements scan the light beams in a horizontal scanning direction and a vertical scanning direction and display an image on the projection plane.

12. The projection display device according to claim 11, wherein at least one of said light scanning elements is a galvanometer mirror fabricated by a semiconductor process.

13. The projection display device according to claim 11, wherein at least one of said light scanning elements is a mechanically fabricated galvanometer mirror.

14. The projection display device according to claim 11, wherein at least one of said light scanning elements is a rotating polygonal mirror.

15. The projection display device according to claim 11, wherein at least one of said light scanning elements is a silicon micromechanical mirror.

16. The projection display device according to claim 11, wherein at least one of said light scanning elements is a scanning element with a gimbal structure.

17. The projection display device according to claim 1, wherein at least one of said light sources for emitting the light beams is an edge emitting laser.

18. The projection display device according to claim 1, wherein at least one of said light sources for emitting the light beams is a super-luminescent diode.

19. The projection display device according to claim 1, wherein at least one of said light sources for emitting the light beams is a surface emitting laser.

20. The projection display device according to claim 1, wherein at least one of said light sources for emitting the light beams is a light emitting diode.

21. The projection display device according to claim 1, wherein at least one of said light sources for emitting the light beams is a resonant-type light emitting diode.

22. The projection display device according to claim 1, wherein at least one of said light sources for emitting the light beams is a laser diode pumped solid-state laser.

23. The projection display device according to claim 22, wherein said laser diode pumped solid-state laser emits wavelength converted light from one of an optical crystal, a piece of glass doped with a rare earth element or pigment, and a fiber doped with a rare earth element or pigment, the wavelength converted light being induced by semiconductor laser light.

24. The projection display device according to claim 1, wherein at least one of said light sources for emitting the light beams emits the second harmonic of laser light as a light beam.

25. The projection display device according to claim 24, wherein said light source for exciting the second harmonic of the laser light is a semiconductor laser or an LD pumped solid-state laser.

26. A projection display device for displaying an image by projecting light beams onto a projection plane, comprising:
    light source means for emitting light beams; and
    light scanning means for scanning the emitted light beams toward the projection plane, wherein
    the light beams from said light source means are radiated as pulses of light corresponding to respective pixels by splitting the light beams between adjacent pixels,when the light beams are being scanned.

27. The projection display device according to claim 26, wherein said scanning means includes first scanning means for scanning light beams in a horizontal direction, and second scanning means for scanning light beams in a vertical direction.

28. The projection display device according to claim 27, wherein at least one of said first and second scanning means is a galvanometer mirror fabricated by a semiconductor process.

29. The scanning means according to claim 27, wherein at least one of said first and second scanning means is a mechanically fabricated galvanometer mirror.

30. The scanning means according to claim 27, wherein at least one of said first and second scanning means is a rotating polygonal mirror.

31. The scanning means according to claim 27, wherein at least one of said first and second scanning means is a silicon micromechanical mirror.

32. The scanning means according to claim 27, wherein said first and second scanning means are arranged in a gimbal structure.

* * * * *

UNITED STATES PATENT AND TRADEMARK OFFICE
CERTIFICATE OF CORRECTION

PATENT NO. : 6,945,652 B2 Page 1 of 1
APPLICATION NO. : 10/180114
DATED : September 20, 2005
INVENTOR(S) : Sakata et al.

It is certified that error appears in the above-identified patent and that said Letters Patent is hereby corrected as shown below:

On title page

[56] REFERENCES CITED: 4th line

OTHER PUBLICATIONS, "Japanes" should read --Japanese--.

COLUMN 6:

Line 2, "MgSe/BeznTe." should read --MgSe/BeZnTe.--.

COLUMN 9:

Line 26, "convent" should read --convert--.

COLUMN 11:

Line 17, "independtly" should read --independently--.

COLUMN 12:

Line 26, "pixels," should read --pixels--.

Signed and Sealed this

Twenty-second Day of August, 2006

JON W. DUDAS
*Director of the United States Patent and Trademark Office*